July 2, 1946.
G. H. B. DAVIS ET AL
2,403,268
FUELS FOR AIRCRAFT ENGINES
Filed Oct. 24, 1941
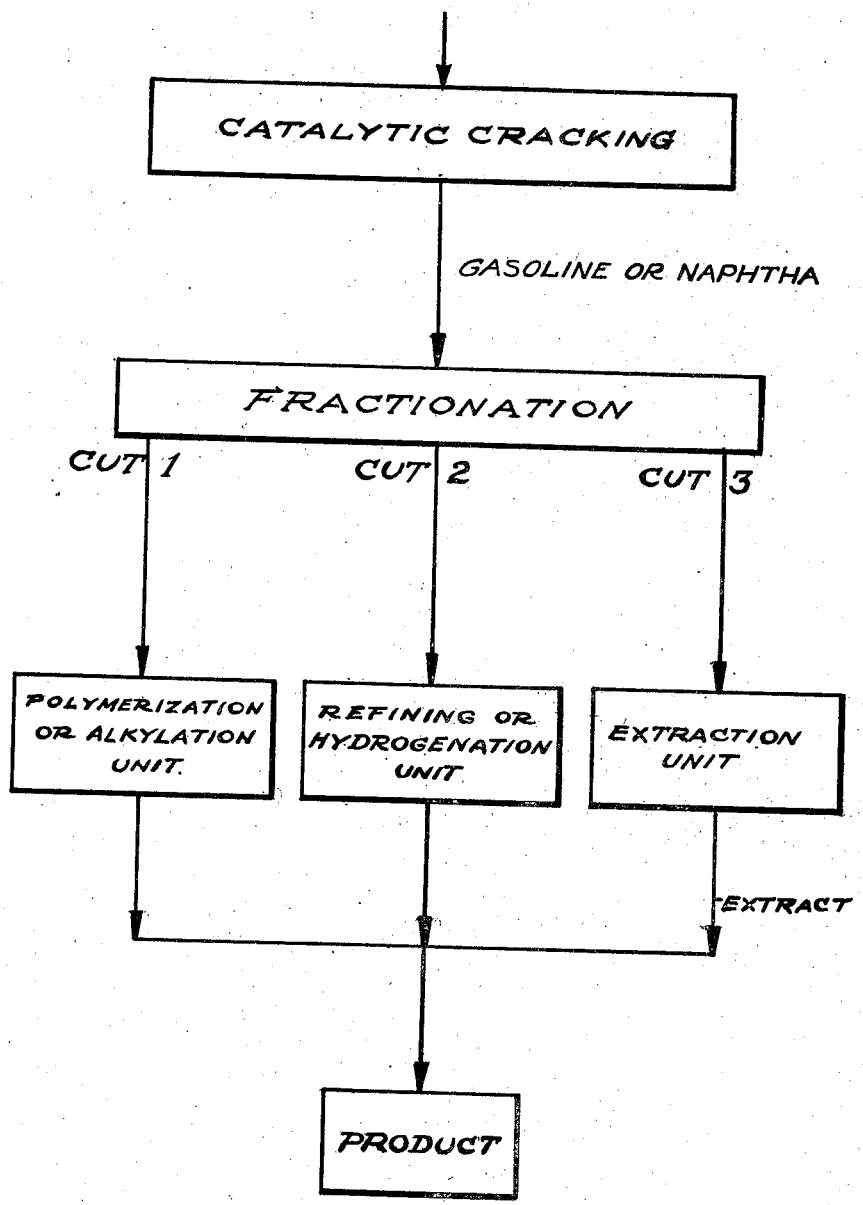

Patented July 2, 1946

2,403,268

UNITED STATES PATENT OFFICE 2,403,268

FUELS FOR AIRCRAFT ENGINES

Garland H. B. Davis, Elizabeth, William J. Sweeney, Summit, and Walter A. Herbst, Union, N. J., assignors to Standard Oil Development Company, a corporation of Delaware Application October 24, 1941, Serial No. 416,318

7 Claims. (Cl. 196—13)

This invention relates to the preparation of fuels which have essential performance qualities for supercharged aircraft engines of high power output from products of catalytic cracking, and has the object of providing a method for efficiently and economically obtaining such fuels.

The importance of quick take-off, reliable performance, and higher power output for a given engine weight has stimulated the development of aircraft engines which are very exacting in fuel requirements.

The mean effective pressures of aircraft engines rose from 125 lbs./sq. in. in 1930 to 200 lbs./sq. in. in more recent times when 100 octane number fuels were made available by commercial methods for synthesizing iso-octane and similar specific isoparaffins, but at present the importance of high powered aircraft engines, particularly for military purposes, makes urgent the problem of producing an adequate supply of high quality fuels which give better performance than the 100 octane number fuels.

In accordance with the present invention, the desired aircraft fuels are efficiently prepared from low boiling products of a catalytic cracking process by eliminating types of compounds which lower the quality of the fuel and selectively utilizing those which in suitable concentrations and purity combine to give the best results. The desired fuels differ in composition from fuels hitherto rated as the best for aviation engines or for high power automobile engines.

Ingredients of major importance in the desired aircraft fuels are secured in accordance with the present invention by processing in a particular manner low boiling hydrocarbons derived from a catalytic cracking under conditions that yield a gasoline having a high olefin content.

Preparation of the desired fuel may be carried out efficiently and expediently with a self-sufficing treatment of a single petroleum cracking stock, as will be explained in greater detail with reference to the schematic flow diagram shown in the drawing.

As an illustrative example, the following practical embodiment will be described to show a preferred method of cracking in order to obtain a suitable cracked lower boiling product and the preferred procedure for treating this product to obtain the desired superior aircraft fuel ingredients.

EXAMPLE

An East Texas gas oil subjected to suitable conditions of catalytic cracking forms a gasoline product having a high content of olefins and a relatively low paraffin content. The gas yield is relatively high, also. Satisfactory conditions used in this operation are briefly summarized as follows:

| Type of catalyst | Activated clay, silica-alumina gels, silica-magnesia gels |
|---|---|
| Catalyst temperature, average ° F | 900–950 |
| Catalyst to oil, wt. ratio | 3–5:1 |
| Contact time seconds | 16–40 |
| Yield, based on output volume per cent | 20–55 |

Gasoline products obtained by the described cracking operation have the following compositions:

| Components of gasoline products | Volume per cent |
|---|---|
| Total olefins | 58–74 |
| Aromatics | 9–5 |
| Naphthenes | 12–11 |
| Paraffins, normal and branched | 21–10 |
| Olefins distilled off below 158° F. (percentage of total olefins) | 5–12 |

By varying the conditions within approximately the ranges indicated, the yields of the different components may be altered to some extent in approximately the ranges indicated, and it is preferred to use conditions which maintain the yield of olefins in the gasoline above about 50% with paraffins at a low figure, less than about 20 volume per cent. Appropriate forms of cracking apparatus, variations in manipulations, and variations in the catalyst which may be used are disclosed in U. S. Patents 2,247,126, 2,221,824, 2,230,552, and 2,246,959.

As indicated in the drawing, from a gasoline product of cracking, such as described, certain narrow cuts are separated by careful fractionation to eliminate, in so far as possible, other fractions of the gasoline product which are not to be used for the present purposes.

The drawing is a diagrammatic flow sheet of the process which is self-explanatory.

The cuts specifically segregated to be used for the present purposes are: (1) a low boiling fraction containing large amounts of 4 carbon atom olefins and paraffins for use in obtaining the desired alkylate or polymer gasoline hydrocarbons; (2) a narrow cut boiling within the range of 100° F. to 140° F. containing predominantly olefins with naphthenes and paraffins; and (3) a narrow cut boiling between 200° F. and 300° F. containing aromatics.

The low boiling cut (1) boiling below 100° F., containing high proportions of normal butenes, isobutene, butanes, and minor proportions of propane and propene, is preferably treated in a suitable manner to form branched aliphatic polymers and copolymers having 7 to 8 carbon atoms per molecule. Preferably the hydrocarbons in this cut are treated to form dimers of isobutylene and unsaturated copolymers of isobutylene and normal butylene by subjecting the monomeric olefins to the action of sulfuric acid (60%, 70%, or stronger) at temperatures of about 100° F. to 200° F. It is preferred to have a high ratio of normal butene to isobutene reacted. The conditions preferably used are those conducive to the formation of branched copolymers and the branched olefinic dimer of isobutylene.

For the alternative alkylation treatment, a procedure adapted and used for the present purpose is one in which sulfuric acid having titratable acidity of between 86 and 100%, preferably 90 to 98%, at a temperature between 0 and 125° F. (preferably 30 to 50° F.) is contacted with the liquefied hydrocarbons containing at least 1 mol of isobutane per mol of olefins, preferably in a ratio of 10:1 under sufficient superatmospheric pressure to maintain the reactants in liquid phase under intense agitation with the acid present in a proportion 0.3 to 1.2 part per part by volume of hydrocarbons, generally 0.5:1.

Although olefinic polymers have generally been regarded as being too unsaturated for use in a 100 octane fuel, and accordingly have been by usual practice converted to iso-octane by hydrogenation, for the purpose of the present invention they are preferably allowed to remain partly unsaturated, but preferably the polymer or alkylate gasoline is distilled to secure a narrow fraction boiling in the range of 130° F. to 240° F.

The narrow fraction (2), boiling in the range of 100° F. to 140° F. segregated from the cracked gasoline is preferably subjected to a suitable refining treatment for removal of any small amount of unstable gum-forming compounds, e. g., diolefins. The refining may be made by an adsorptive clay treatment or other established refining method for this purpose. Alternatively, the refining treatment of this narrow cut (2) is accomplished by a catalytic hydrogenation under suitable mild conditions to selectively saturate the unsaturated compounds, and particularly the diolefins.

The hydrogenation applied to only a specific small portion of the total naphtha product is economical and efficient and avoids saturation of higher boiling components to compounds unsuitable for use in the desired aviation fuels. The range of temperatures employed in hydrogenating the cut (2) is from about 200 to 600° F. Elevated pressures of about 50 to 200 lbs./sq. in. are satisfactory but the upper limit may be still higher depending upon economic dictates. Suitable catalysts are finely divided nickel or copper, alone or supported on carriers, e. g. pumice, clay, etc., or difficultly reducible oxides, such as alumina, thoria, chromic oxide, and the like. With the hydrocarbon feed substantially free of sulfur, the metal catalysts which are somewhat susceptible to poisoning may be employed, whereas the metal oxide catalysts are more immune to sulfur poisoning. Following the hydrogenation, the hydrocarbons may be redistilled to keep the boiling range of the recovered product to be used in the fuel within the limits of 100° F. to 140° F.

A typical hydrogenation treatment employed in obtaining saturated components of cut (2) described in the preferred fuel compositions hereinafter described is one in which one volume of this fraction is compressed in the vapor state with about 15 volumes of hydrogen under pressure of 500 to 800 lbs./sq. in. and contacted at a temperature between about 300° F. to 400° F. with a catalyst containing finely divided copper and zinc oxide for a period of about 60 to 90 minutes in an autoclave. The time for hydrogenation may be controlled to reduce the bromine number, which is a measure of the unsaturation, to any desired extent. In the present instance, a desired lowering of the bromine number from above 50 (g. Br absorbed/100 g. hydrocarbons) to below 5 is obtained in the hydrogenating of the aliphatic and alicyclic components of cut (2).

The narrow cut (3) is preferably subjected to a selective solvent extraction treatment to concentrate the aromatics by removal of non-aromatic constituents. Various extraction methods may be used, and, in general, they consist in mixing the hydrocarbon fraction with about an equal volume or more of the selective solvent, thoroughly agitating the mixture, then allowing the mixture to separate into two layers which takes place at a temperature below that at which the solvent becomes completely miscible with the oil. The heavier layer, known as the extract layer, is a concentrated solution of the aromatic components extracted by the selective solvent. Types of selective solvents which may be used are, for example, phenols, aniline, furfural, nitrobenzene, triphenol phosphate, tri-orthocresyl phosphate, liquid sulfur dioxide, etc. The selectivity of these solvents may be modified by the addition of certain materials, such as water, alcohols, glycol, etc. Instead of one solvent, a mixture of solvents may be used; for example, a mixture of phenol with cresols. The extract layer is separated from the raffinate, the lighter layer known as the raffinate layer, usually by decantation, and the selective solvent is removed from the extracted hydrocarbons by means of distillation, or another suitable method.

In concentrating the aromatics within the narrow cut (3), a high efficiency and economy is obtained while thus procuring exactly the desired super aviation fuel components. Before the extraction, this cut frequently contains about 30% to 50% of aromatics, and it is desirable to have it contain at least about 75% of aromatics, which is accomplished by the extraction step, for example, by extracting with 50 to 85% by volume of liquefied sulfur dioxide at below 0° F. (about −10° F.).

After the segregated three cuts are treated as indicated, a recombination is made of the desired products obtained therefrom in proper proportions to form the improved balanced aviation fuels.

The final hydrocarbon fuel products obtained boil substantially within the range of about 100° F. to 400° F., have satisfactory volatility characteristics, good stability, and satisfactory vapor pressures required by specifications, i. e., Reid vapor pressures of the order of 7 to 8 mainly.

Superior balanced aviation fuel compositions are obtained by combining the components in the following manner:

Isoaliphatics having 7 to 8 carbon atoms per molecule derived from cut (1) in a proportion of about 55%, or about 50–60% by volume, with derivatives of cut (2) boiling within the range of 100° F. to 140° F. in a proportion of about 25% or about 20-35% by volume, and with the aromatic concentrate derived from cut (3) boiling within the range of 200° F. to 300° F. in a proportion of about 25% or about 30-50%, by volume.

The proportion of each component is adjusted to make the total of the fuel components amount to approximately 100% of a hydrocarbon fuel boiling substantially in the range of 100° F. to 300° F.

For example, a particularly effective fuel composition is formulated in the following manner:

|  | Per cent |
|---|---|
| Isoaliphatics (C₇ and C₈) derived from cut (1) | 56 |
| Saturated components of cut (2) | 19 |
| Aromatic components of cut (3) | 25 |
|  | 100 |

As can be seen from performance data, there is a little variation which may be made in the relative proportions of the indicated components without serious impairment of performance. The proportion of cut (3) containing aromatics may be reduced with corresponding increase in the proportion of the isoaliphatics derived from cut (1) to about 70 or about 75%, but a change like this tends to make the fuel too inferior unless the components used are obtained with particular precision.

To clarify test results and advantages of the present invention, a brief description will be given of the method for testing the fuel compositions formed in accordance with the present invention.

Briefly, the supercharge method for determining the performance of a test fuel in a high power aircraft engine is as follows: The intake manifold pressure and fuel flow are adjusted until there exists barely audible knock at a maximum combustion chamber wall temperature. The air and fuel mixture are introduced into the combustion chamber under pressure. The pressure in the intake manifold increases the charge density so that a greater weight of combustible mixture is drawn into the cylinder. This raises the ultimate combustion-pressure, so that the indicated power output of an engnie is practically in direct proportion to the absolute pressure in the manifold. In this way, a highly exact measurement of anti-knock value can be made on the basis of the maximum engine power output obtained without knock, and this test correlates with the performance of the fuel in full scale operation. It has been demonstrated by numerous tests that sensitive ratings can be obtained of fuels having octane numbers above 100 by measurement of the maximum permissible (without detonation) indicated mean effective pressure (I. M. E. P.), which is a measure of highest power output obtained with a fuel without knocking when operating on the test fuel.

Using the supercharged engine performance test, it was clearly demonstrated that fuel compositions made in accordance with the present invention are far superior to an ordinary aviation fuel which is about equal in anti-knock quality to iso-octane, which has an octane number of 100 and is used as a reference fuel.

Representative data are given in the following table on fuels produced in accordance with the present invention, and comparative data are also shown therein for a 100 octane number aviation reference fuel.

TABLE

*Comparative supercharged engine performance tests*

| Fuel tested with 3 cc./gal. TEL | Max. power (I. M. E. P.) lbs./sq. in. | Boost match octane No.[1] | Rich mixture appreciation (ΔI. M. E. P.) lean to rich |
|---|---|---|---|
| Iso-octane | 265 | 3.0 | 12 |
| Commercial 100 octane grade aviation gasoline | 200 | 0.2 | 20 |
| 20% isopentane 80% C₄ alkylate | 260 | 2.5 | 10 |
| 80% alkylate from cut (1) 20% cat. cracked cut (2) | 274 | 2.4 | 33 |
| 56% hydro-polymer from cut (1) 19% saturated cat. cracked component cut (2) 25% aromatic concentrate of cut (3) | 351 | 9.5 | 68 |
| 50% alkylate and polymer from cut (1) 25% saturated cat. cracked component cut (2) 25% aromatic concentrate of cut (3) | 348 | 7.2 | 105 |

[1] Expressed as cc. of TEL (tetraethyl lead) needed in 1 gal. of iso-octane to match anti-knock performance.

It is clearly evident that the fuels obtained in accordance with the present invention are far superior in actual engine performance to the aviation fuels of 100 octane number hitherto considered the best attainable, despite indications by A. S. T. M. and C. F. R. aviation ratings that these fuels have octane numbers quite inferior to the 100-octane reference fuel. Furthermore, these far superior fuels are made available mainly from a far greater source of supply with operations less costly than those required for the preparation of pure iso-octane or similar purely synthetic fuels.

It can be correctly said that the super aviation fuels provided herein have the essential qualities for the efficient operation of high power output supercharged aviation engines requiring a better quality fuel than the conventional 100 octane aviation fuels can supply.

The improved aviation fuel compositions should be blended with from about ½ to about 3 cc. of a lead alkyl anti-knock agent, preferably tetraethyl lead, in order to obtain the required maximum efficiency. Other additives may be incorporated into the fuel in small amounts, if desired, such as a lubricant, gum fluxing agent, dye, gum inhibitor, corrosion inhibitor, etc.

Although the invention has been described, for the sake of simplicity, with reference to a process for treating a single cracking stock, and it has been demonstrated how it is conveniently and efficiently applicable in this manner, it is to be understood that any number of cracking stocks may be processed individually or jointly in the same or different units to arrive at the same results. The nature of the initial cracking stocks, does not make any substantial difference, for it has been found that the catalytic vapor phase cracking can be controlled to give the desired type of naphtha products adapted for the further processing treatments described. Thus, the initial charging stock may be a light or heavy gas oil fraction from paraffinic, naphthenic, aromatic, or mixed base petroleum oils. Accordingly, also, the final fuel composition may contain products from different initial materials.

It may be noted that important features of the invention reside in the procurement of the superior aviation fuels by utilizing certain restricted portions of the described type of naphtha products, but that in procuring the iso-aliphatics in the alkylation or polymerization processes one may use normally gaseous hydrocarbon reactants from other sources. Known alkylation and polymerization procedures may be employed on normally gaseous olefinic and paraffinic hydrocarbons of the kind supplied by low boiling cut (1) suitably proportioned for the reaction. However, it should be noted that highly important advantages are obtained in essentially using the segregated narrow boiling cut (2) components and cut (3) components of these naphtha products for economically obtaining desired supplies of the superior aviation fuels, definitely superior to completely synthesized fuels which are more costly and more limited in supply.

The foregoing examples are illustrative of the invention and are intended to include modifications which come within the spirit of the invention as defined in the appended claims.

We claim:

1. A method of producing a fuel having satisfactory performance characteristics for supercharged aviation engines of high power output, which comprises catalytically cracking a petroleum cracking stock under suitably intense conditions for producing a highly unsaturated gasoline; segregating from said gasoline a fraction boiling below 100° F. mainly composed of 4 carbon atom olefins and paraffins, a second fraction boiling in the range of about 100° F. to 140° F., and a third fraction boiling within the range of 200° F. to 300° F.; converting components in said fraction boiling below 100° F. to iso-aliphatic hydrocarbons having 7 to 8 carbon atoms per molecule, refining said second fraction to remove therefrom unstable olefinic hydrocarbon, separating from said third fraction a concentrate of aromatic hydrocarbons; and combining said iso-aliphatic hydrocarbons with said refined second fraction boiling in the range of about 100° F. to 140° F. and with said aromatic concentrate boiling within the range of 200° F. to 300° F.

2. The method of producing a fuel having satisfactory performance characteristics for supercharged aviation engines operated at maximum effective pressures above 200 lbs./sq. in., which comprises catalytically cracking a petroleum cracking stock under suitably intense conditions to produce a gasoline containing more than about 50% by volume of olefins; segregating from said gasoline a fraction boiling below 100° F., mainly composed of 4 carbon atom olefins and paraffins, a second fraction boiling within the range of 100° F. to 140° F., and a third fraction boiling within the range of 200° F. to 300° F.; converting components in said fraction boiling below 100° F. to iso-aliphatic hydrocarbons having 7 to 8 carbon atoms per molecule, hydrogenating unsaturated components in said second fraction, extracting an aromatic concentrate from said third fraction; and combining said iso-aliphatic hydrocarbons with said hydrogenated second fraction boiling in the range of 100° F. to 140° F., and with said aromatic concentrate from the third fraction boiling in the range of 200° F. to 300° F.

3. A method of producing a fuel having satisfactory performance characteristics for supercharged aviation engines of high power output, which comprises catalytically cracking petroleum charging stocks under suitably intense conditions to produce highly unsaturated naphtha products; segregating from said naphtha products fractions boiling below 100° F. mainly composed of 4 carbon atom olefins and paraffins, a second fraction boiling within the range of 100° F. to 140° F., and a third fraction boiling within the range of 200° F. to 300° F.; converting components in said fractions boiling below 100° F. to iso-aliphatic hydrocarbons having from 7 to 8 carbon atoms per molecule, refining said second fraction to eliminate therefrom diolefins, extracting from said third fraction an aromatic concentrate containing at least 75% by volume aromatic hydrocarbons; and combining said iso-aliphatic hydrocarbons with said refined second fraction boiling in the range of 100° F. to 140° F. and with said aromatic concentrate.

4. The method of producing a fuel having satisfactory performance characteristics for supercharged aviation engines of high power output, which comprises catalytically cracking a petroleum charge stock under suitably intense conditions to produce a highly unsaturated gasoline containing more than 50% by volume of olefins; segregating from said gasoline a fraction boiling within the range of 100° F. to 140° F. and a fraction boiling within the range of 200° F. to 300° F.; hydrogenating said fraction boiling within the range of 100° F. to 140° F. to the extent that the hydrogenated product has a bromine number below about 5, extracting from said fraction boiling within the range of 200° F. to 300° F. an aromatic concentrate containing at least about 75% by volume of aromatics, and combining about 20% to 35% by volume of said hydrogenated fraction with about 30% to 35% by volume of said aromatic concentrate and with a sufficient proportion of iso-aliphatic hydrocarbons having 7 to 8 carbon atoms per molecule to form a hydrocarbon fuel containing 100% by volume of said combined substances.

5. The method of producing a fuel having satisfactory performance characteristics for supercharged aviation engines of high power output, which comprises catalytically cracking a petroleum cracking stock under suitably intense conditions to produce a naphtha containing more than about 50% by volume of olefins; segregating from said naphtha a fraction boiling below 100° F. mainly composed of 4 carbon atom olefins and paraffins, a second fraction boiling within the range of 100° F. to 140° F., and a third fraction boiling within the range of 200° F. to 300° F.; converting components in said fraction boiling below 100° F. by alkylation and polymerization to iso-olefins and iso-paraffins having 7 to 8 carbon atoms per molecule, refining said second fraction to eliminate therefrom unsaturated hydrocarbons, extracting from said third fraction an aromatic concentrate; and combining about 50% to 60% by volume of said iso-olefins and iso-paraffins with about 20% to 35% by volume of said refined second fraction, and a remaining proportion of said aromatic concentrate to make a total of approximately 100% of the fuel.

6. The method as described in claim 5, in which said iso-olefins and iso-paraffins are admixed in about equal proportions to form about 50% by volume of the fuel and are combined with about 25% by volume of said refined second fraction and with about 25% by volume of said aromatic concentrate.

7. The method of producing a fuel having satisfactory performance characteristics for supercharged aviation engines operated at maximum effective pressures above 200 lbs./sq. in., which comprises catalytically cracking petroleum cracking stock under suitably intense conditions to produce a highly unsaturated gasoline, segregating from said gasoline a fraction boiling below 100° F. mainly composed of 4 carbon atom olefins and paraffins, a second fraction boiling within the range of 100° F. to 140° F., and a third fraction boiling within the range of 200° F. to 300° F.; converting components in said fraction boiling below 100° F. to iso-paraffins having 7 to 8 carbon atoms per molecule, hydrogenating unsaturated hydrocarbons in said second fraction, extracting an aromatic concentrate containing above 75% by volume of aromatic hydrocarbons from said third fraction, and combining about 56% by volume of said iso-paraffins with about 19% by volume of said hydrogenated second fraction and about 25% by volume of said aromatic concentrate.

GARLAND H. B. DAVIS.
WILLIAM J. SWEENEY.
WALTER A. HERBST.